July 4, 1950   L. W. KASS ET AL   2,514,074
BRAKE BEAM SAFETY SUPPORT
Filed April 15, 1949   2 Sheets-Sheet 2
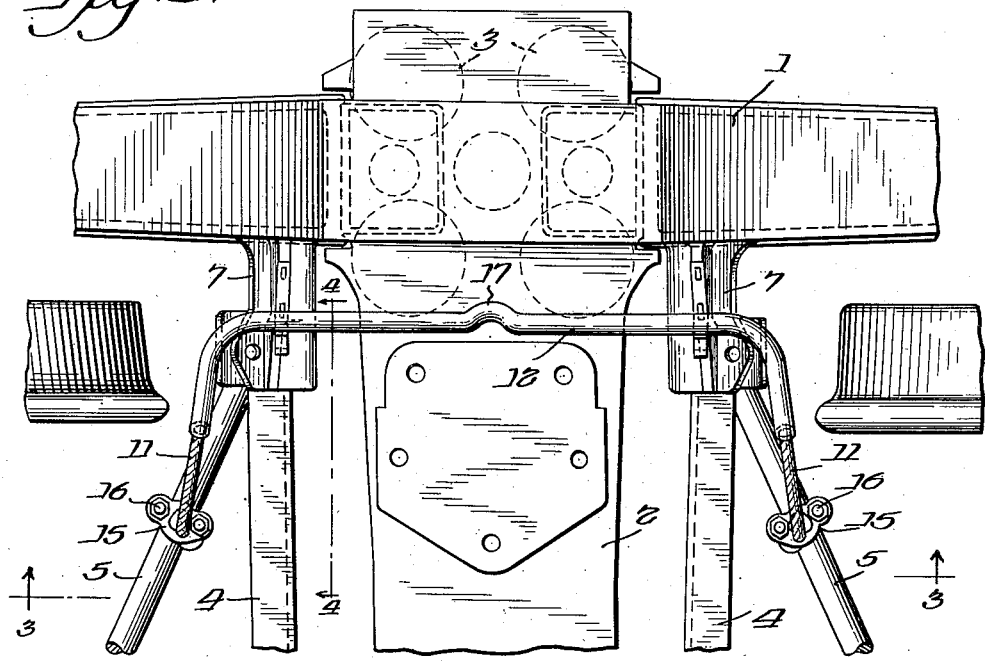
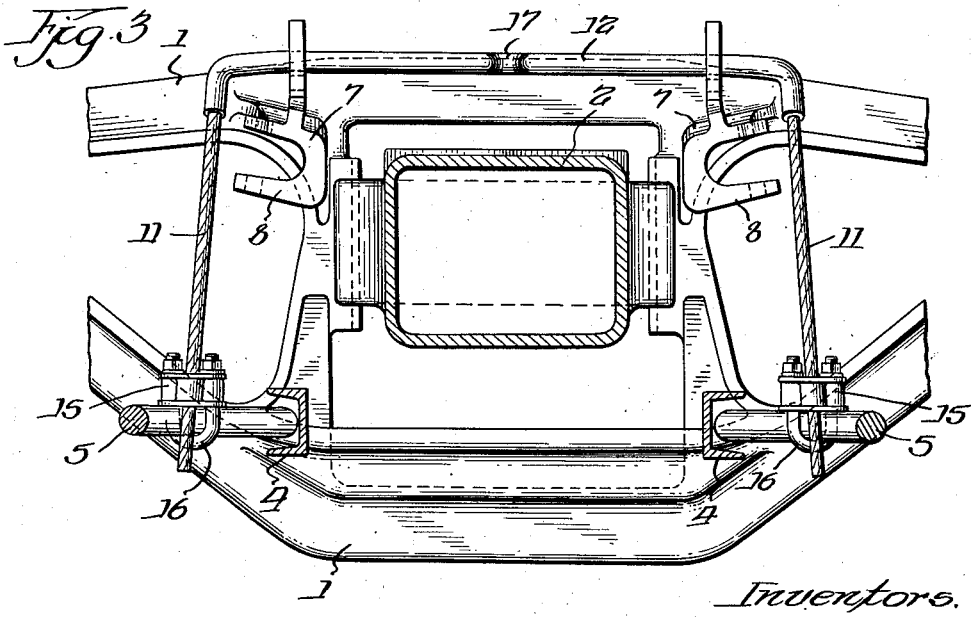
Inventors.
Lawrence W. Kass, &
Clarence A. Henrickson.
By Shee & Shee Attys.

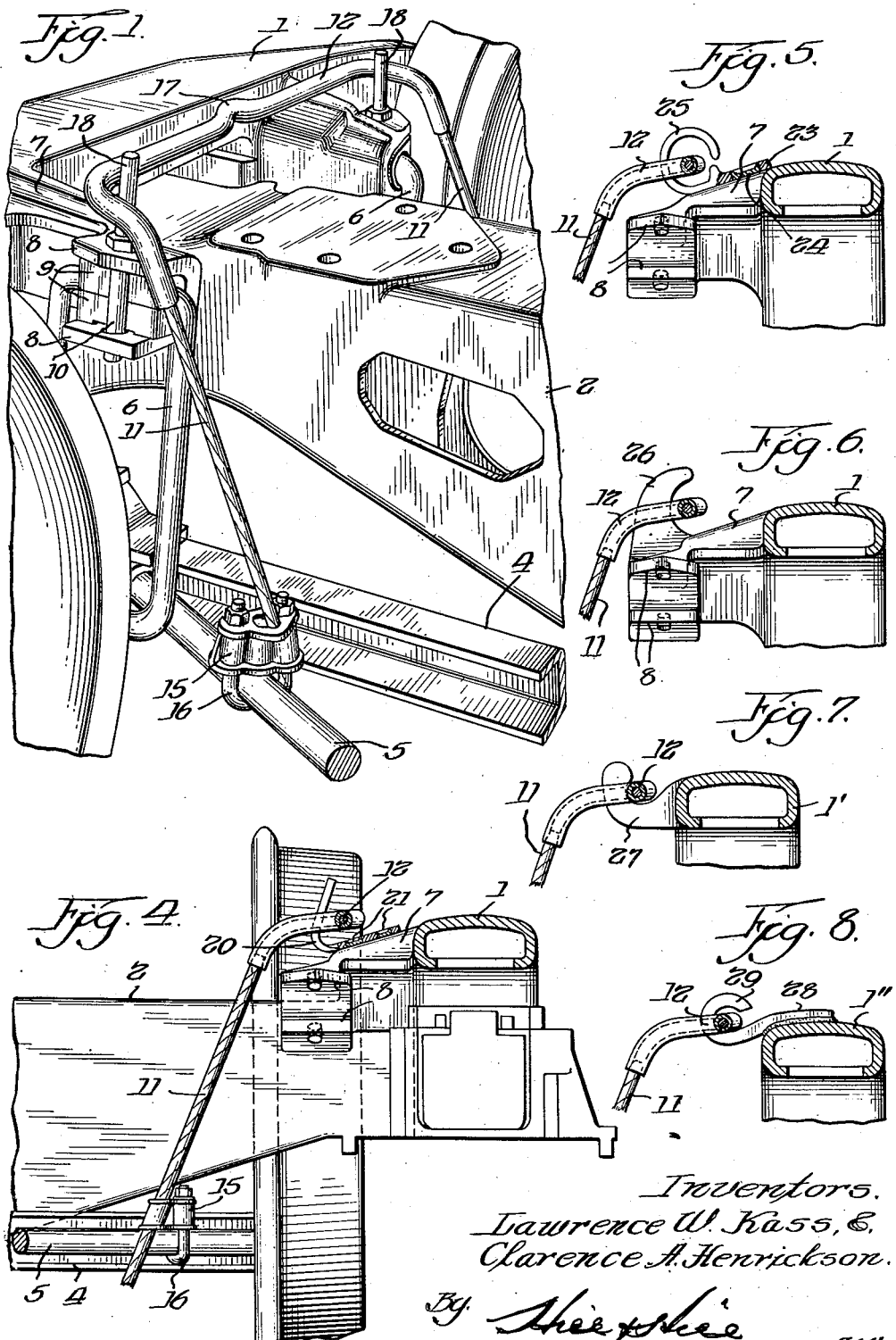

Patented July 4, 1950

2,514,074

UNITED STATES PATENT OFFICE 2,514,074

BRAKE BEAM SAFETY SUPPORT

Lawrence W. Kass and Clarence A. Henrickson, Chicago, Ill., assignors to Grip Nut Company, Chicago, Ill., a corporation of Illinois Application April 15, 1949, Serial No. 87,598

4 Claims. (Cl. 188—210)

Our invention belongs to that general class of devices known as brake beam safety supports and is in the nature of an improvement on the safety support shown in the Lawrence W. Kass Patent No. 2,364,201 which was granted December 5, 1944, or the Harley E. Anderson Patent No. 2,335,628 which was granted on November 30, 1943, both assigned to the Grip Nut Company.

In the conventional railroad car trucks there are two side frames spaced apart from each other with a bolster extending between the side frames and carried thereby. The brake rigging consisting of brake beams carrying the brake shoes is carried on each side of the bolster between the wheels, being suspended or carried at each end of the bolster in any satisfactory means, as for example, by hangers swingably mounted on the truck frame, or in some constructions are slidably carried by the truck side frames. The brake actuating mechanism is connected to the brake beams and functions to set and release the brakes, but inasmuch as the actuating mechanism forms no part of this invention, it is considered unnecessary to illustrate or describe the same.

Our safety support is designed to carry one or both beams at one or both ends of the beam in the event of failure of any one or more of the hangers or equivalent supports, thereby preventing the brake beams from dropping onto the road bed with disastrous results.

The invention has among its objects the production of a brake beam safety support that is normally carried by the brake beams regardless of their design, but which in the event of the failure of the supports normally carried in the brake beams, will be carried by the side frames of the truck and with it carry the brake beams, brake shoes, etc.

Another object is to the production of a device of the kind described which is simple, inexpensive, efficient and readily applied to any of the standard truck constructions.

Another object is the provision of a safety support for brake beams which is not in any way affected by variation in truck loads or by up and down movement of the bolster when the truck is rolling, the bolster being carried by springs mounted on the side frames.

A particular object of the invention is the provision of means for carrying the brake rigging assembly entirely independently of the bolster, regardless of whether the rigging is carried by the hangers or their equivalents or by the safety support, whereby the same is not in any way affected by variation in the load on the bolster.

Another object is the production of a safety support which will not rattle or chatter and become noisy, and will permit the application or release of the brakes in the customary manner, regardless of whether the beams are carried by the hangers or their equivalents or, in an emergency, by the safety support.

Many other objects and advantages of the construction herein shown and described will be obvious to those skilled in the art from the disclosures herein given.

To this end our invention consists in the novel construction, arrangement and combination of parts herein shown and described, and more particularly pointed out in the claims.

In the drawings, wherein like reference characters indicate like or corresponding parts:

Fig. 1 is a perspective view of a truck side frame, bolster, portion of a brake beam and our safety support carried by the side frame by means of one form of support;

Fig. 2 is a plan view of a side frame and bolster with the safety support arranged to be carried by the side frame as required by a modified construction;

Fig. 3 is a sectional view taken substantially on line 3—3 of Fig. 2;

Fig. 4 is a sectional view taken substantially on line 4—4 of Fig. 2; and

Figs. 5, 6, 7 and 8 illustrate other embodiments of the invention, showing modified means for carrying the safety support and brake beam from a side frame when the safety support is required to carry the brake beam in an emergency.

Our support, as before mentioned, is designed to carry brake rigging in the event of failure of the normal carrying means therefor, and includes a cable at each side of the truck which extends across the bolster but spaced therefrom, with the ends of the same secured to the brake beams and connecting them. The cable connecting the brake beams is flexible but substantially stiff and is normally carried by the brake beams above and spaced from the bolster, and the side frame is provided with means which normally do not carry the safety support and beams, but in the event of failure of the normal beam support, will engage the cable of the safety support and carry the brake beams connected with that cable.

Referring to the drawings and first to Fig. 1, 1 represents one of the side frames at one side of the truck and 2 the bolster extending between the side frames and carried thereby, springs 3 shown in dotted lines in Fig. 2 represent the conventional springs provided on each side frame upon which the bolster ends rest. There are various designs of brake beams, a conventional beam being shown, in which 4 is a compression member and 5 the tension member, the same being carried by hangers 6 swingingly arranged in brackets 7 carried by the side frame and the blocks 9, the assembly being maintained secure by means of bolts 10.

The safety support consists of flexible relatively stiff cables 11, one end of the cable being secured to one brake beam and the other end of the other brake beam at the opposite side of the bolster, the same being substantially U-shaped and extended over the bolster, as shown. The ends are secured to the beams in any suitable manner, as for example, by means of members 15 and U-bolts 16, the U-bolts, as illustrated, securing the fittings onto the tension members 5. Adjustments of fittings may be made on the cables so as to fit the support to the particular truck on which it is to be applied. The cable intermediate the ends is preferably provided with a sheathing or stiffening pipe 12 which is preferably provided with a crimp 17 preventing the cable from shifting in the tube 12.

In the construction shown in Fig. 1, the hanger brackets 8 are provided with posts 18 which may be extensions of the bolts 10 which the safety support engages in the event that either of the hangers 6 fail and the safety support is called upon to carry the brake beams. Ordinarily, the stiffness of the cable 11 is sufficient to hold the intermediate portion 12 away from and off of the hanger brackets 8, the arrangement being such that the brake beam operation is in no way affected by the safety support. The adjustments are preferably such that at all times the support merely floats above the bolster and is free from the hanger brackets except at such time as it may be called upon in an emergency to carry the brake beam. The carrying of the safety support from the side frame, in the event that the safety support is called upon to carry the brake beams, is a marked improvement over the other arrangements inasmuch as variations in load carried by the bolster or roughness of road bed and vibrations of the car structure in no ways affects the safety support or its adjustments when either operative or inoperative but ready to assume the load of carrying the beams. The arrangement shown in Fig. 1 is particularly suitable for installation of the support on old trucks since the pins or bolts 18 may be readily applied to the hanger brackets.

Referring to Figs. 2, 3 and 4, the construction is similar except in this case a hook member 20 is positioned on the bracket 7 and spot-welded or otherwise secured directly to the bracket 7. A similar construction is shown in Fig. 5 in which a member 23 is welded, as indicated at 24, to the bracket 7, and in this case the member 25 corresponding to 20 in Fig. 4 is turned over at its free end to substantially enclose the cable. In the construction shown in Fig. 6, bracket 7 is provided with an integrally formed hook 26 corresponding to the member 20 or 25 of the modified forms.

In the modified construction shown in Fig. 7, 1' represents the side frame and 27 represents a cable support which is formed integrally with the side frame, there being no hanger brackets.

In Fig. 8, 11" represents the side frame to which may be welded a member 28 having an open hook at the end, it being understood that each side frame would be provided with two of these members 27 or 28, the same taking care of the beams at both sides of the bolster.

The constructions shown in either Figs. 7 and 8 are particularly intended to be used on those truck side frames where there are no hangers and hanger brackets, the brake beams in some truck constructions being movably supported on shelves or ledges on the side frame, not necessary to describe herein. As with the other constructions, the cables 11 will be attached at their free ends to the brake beam with the intermediate portion and sheath extending over the supports 27 or 28 or their equivalents arranged directly on the side frames. Normally the cables are so adjusted that they are free of the supports on the side frames except in an emergency when they are called upon to carry the beams.

Referring to all of the figures, it will be particularly noted that the cables in the preferred arrangements are all of lengths so that they will float over and spaced from the bolster and side frame brackets, being preferably carried entirely from the brake beams under normal conditions as described.

Having thus described our invention, it is obvious that various immaterial modifications may be made in the same without departing from the spirit of our invention; hence, we do not wish to be understood as limiting ourselves to the exact form, construction, arrangement, and combination of parts herein shown and described or uses mentioned.

What we claim as new and desire to secure by Letters Patent is:

1. An auxiliary brake beam supporting device of the kind described for railway trucks having side frames, a bolster extending between the side frames and carried thereby, a pair of brake beams movably mounted on the side frames, one at each side of the bolster, and brake beam safety supports each consisting of a semi-flexible cable provided with a fitting at each end for attaching the same to the adjacent brake beams, said cable of a length to extend over and spaced from the bolster, and means for carrying said auxiliary brake beam supporting devices from a side frame upon the failure of the brake beam supporting means adjacent thereto.

2. An auxiliary brake beam supporting device of the kind described for railway trucks having side frames, a bolster extending between the side frames and mounted thereon, a pair of brake beams, hangers swingingly mounted on each of the side frames, one at each side of the bolster, and normally inoperative auxiliary brake beam supporting devices consisting of a semi-flexible cable provided with a fitting at each end for attaching the same to the brake beams, said cables each of a length to extend over the bolster and spaced therefrom and from hanger brackets, and means for carrying said cables from the side frames upon the failure of the brake beam hangers.

3. In a brake beam rigging of the kind described and in combination, spaced side frames, a car bolster extending between and supported by said side frames, a pair of brake beams arranged one on each side of said bolster, hangers carried by the side frames for normally supporting said brake beams at the ends thereof, and supplemental auxiliary supports consisting of cables, said cables arranged one at each end of the bolster with the ends of the cables extending over and spaced from the bolster, with each cable connected at one end to one brake beam and at the other end to the other brake beam, and means carried by the side frames for engaging and supporting said cables and beams connected thereto upon the failure of any one of said hangers.

4. An auxiliary brake beam supporting device for a railway truck having spaced side frames, a bolster carried thereby and movably mounted brake beams arranged adjacent opposite sides of said bolster, said auxiliary device comprising a flexible member extending above the bolster at each side of the truck having means at the terminal extremities thereof for securing the same to each of said brake beams and for supporting said members in an upright position with respect to the brake beams, said cables extending over the bolster, and means on each side frame for engaging said cable and supporting the brake beam upon failure of the normal supporting means for the brake beams.

LAWRENCE W. KASS.
CLARENCE A. HENRICKSON.

REFERENCES CITED

The following references are of record in the file of this patent:

UNITED STATES PATENTS

| Number | Name | Date |
|---|---|---|
| 903,954 | Buck | Nov. 17, 1908 |
| 2,232,576 | Webb | Feb. 18, 1941 |
| 2,416,446 | Kass | Feb. 25, 1947 |